United States Patent
Zeng

(10) Patent No.: US 10,459,483 B2
(45) Date of Patent: Oct. 29, 2019

(54) FUNCTIONAL DEVICE AND MOBILE TERMINAL

(71) Applicant: GUANGDONG OPPO MOBILE TELECOMMUNICATIONS CORP., LTD., Dongguan (CN)

(72) Inventor: Yuanqing Zeng, Dongguan (CN)

(73) Assignee: GUANGDONG OPPO MOBILE TELECOMMUNICATIONS CORP., LTD, Dongguan, Guangdong (CN)

( * ) Notice: Subject to any disclaimer, the term of this patent is extended or adjusted under 35 U.S.C. 154(b) by 0 days.

(21) Appl. No.: 16/130,882

(22) Filed: Sep. 13, 2018

(65) Prior Publication Data

US 2019/0129466 A1    May 2, 2019

(30) Foreign Application Priority Data

Oct. 31, 2017 (CN) .......................... 2017 1 1055920
Oct. 31, 2017 (CN) ..................... 2017 2 1435828 U

(51) Int. Cl.
*H04M 1/00* (2006.01)
*G06F 1/16* (2006.01)
(Continued)

(52) U.S. Cl.
CPC .......... *G06F 1/1624* (2013.01); *G03B 11/043* (2013.01); *G03B 17/04* (2013.01);
(Continued)

(58) Field of Classification Search
CPC ... H04W 76/005; H04W 4/10; H04M 1/0214; H04M 1/23; H04M 1/0247
(Continued)

(56) References Cited

U.S. PATENT DOCUMENTS

2005/0014527 A1    1/2005  Chambers et al.
2008/0316686 A1   12/2008  Yamazato et al.
(Continued)

FOREIGN PATENT DOCUMENTS

CN    103533222 B    8/2016
CN    106850896 A    6/2017
(Continued)

OTHER PUBLICATIONS

Extended European Search Report issued in corresponding European Application No. 18193681.6, dated Nov. 30, 2018 (8 pages).
International Search Report with Written Opinion issued in corresponding International application No. 2018106837, dated Nov. 28, 2018 (10 pages).

*Primary Examiner* — Temica M Beamer
(74) *Attorney, Agent, or Firm* — Ladas & Parry, LLP

(57) ABSTRACT

The present disclosure provides a functional device. The functional device may include a frame, a driving assembly, and a sliding base. The frame defines a cavity. The driving assembly is received in the cavity. The driving assembly may include a motor, a lead screw, and a slider, the lead screw is connected to the rotating shaft of the motor, the slider is sleeved on the lead screw, the sliding base is slidably connected to the frame. The sliding base is slidably connected to the frame and has a magnetic attraction with the slider, configured to hold a functional component. When the rotating shaft drives the lead screw to rotate, the slider drives the sliding base to move relative to the frame to extend the functional component out of the frame or retract into the cavity. The present disclosure also provides a mobile terminal.

20 Claims, 7 Drawing Sheets

(51) Int. Cl.
  *G03B 11/04* (2006.01)
  *G03B 17/04* (2006.01)
  *H04M 1/02* (2006.01)
  *H04N 5/225* (2006.01)
  *G06F 21/32* (2013.01)

(52) U.S. Cl.
  CPC .......... *G06F 1/1605* (2013.01); *G06F 1/1607* (2013.01); *G06F 1/1686* (2013.01); *G06F 21/32* (2013.01); *H04M 1/0237* (2013.01); *H04M 1/0264* (2013.01); *H04N 5/2257* (2013.01)

(58) Field of Classification Search
  USPC .......................... 455/575.4, 550.1, 90.2, 90.3
  See application file for complete search history.

(56) References Cited

U.S. PATENT DOCUMENTS

| | | | |
|---|---|---|---|
| 2017/0171371 A1* | 6/2017 | Jannard | H04M 1/0264 |
| 2017/0374248 A1* | 12/2017 | Eromaki | H04N 5/2254 |
| 2019/0014201 A1 | 1/2019 | Bao | |

FOREIGN PATENT DOCUMENTS

| | | |
|---|---|---|
| CN | 206251153 U | 6/2017 |
| CN | 106899721 A | 8/2017 |
| CN | 107071242 A | 8/2017 |
| CN | 107197133 A | 9/2017 |
| CN | 207354463 U | 5/2018 |
| CN | 207782861 U | 8/2018 |
| EP | 2562596 A1 | 2/2013 |

* cited by examiner

FUNCTIONAL DEVICE AND MOBILE TERMINAL

CROSS-REFERENCE TO RELATED APPLICATION

This application claims priority to a Chinese application No. CN201711055920.3 filed on Oct. 31, 2017, titled "FUNCTIONAL DEVICE AND MOBILE TERMINAL" and a Chinese application No. CN201721435828.5 filed on Oct. 31, 2017, titled "FUNCTIONAL DEVICE AND MOBILE TERMINAL". The entireties of the above-mentioned applications are hereby incorporated by reference herein.

TECHNICAL FIELD

The present disclosure generally relates to the field of electronic devices, and particularly to a functional device and a mobile terminal.

BACKGROUND

With the rapid development of communication technology, mobile phones are playing an increasingly important role in today's life, work and entertainment. More and more functional components, such as cameras, receivers, and proximity sensors, are provided to the mobile phones to implement a variety of user functions.

SUMMARY

The present disclosure provides a functional device and a mobile terminal.

The disclosure provides a functional device. The functional device may include a frame, a driving assembly, and a sliding base. The frame defines a cavity. The driving assembly is received in the cavity. The driving assembly may include a motor, a lead screw, and a slider. The lead screw is connected to the rotating shaft of the motor, the slider is sleeved on the lead screw, and the sliding base is slidably connected to the frame. The sliding base is slidably connected to the frame and has a magnetic attraction with the slider. The sliding base is configured to hold a functional component. When the rotating shaft drives the lead screw to rotate, the slider drives the sliding base to move relative to the frame to extend the functional component out of the frame or retract into the cavity.

The disclosure also provides a mobile terminal. The mobile terminal may include a housing, a display module, and a functional device. The display module is engaged with the housing and covering the receiving opening. The functional device is housed in the cavity. The functional device may include a functional component, a frame, a driving assembly, and a sliding base. The frame defines a cavity. The driving assembly is received in the cavity. The driving assembly may include a motor, a lead screw, and a slider. The lead screw is connected to the rotating shaft of the motor, the slider is sleeved on the lead screw, and the sliding base is slidably connected to the frame. The sliding base is slidably connected to the frame and has a magnetic attraction with the slider. The sliding base is configured to hold the functional component. When the rotating shaft drives the lead screw to rotate, the slider drives the sliding base to move relative to the frame to extend the functional component out of the frame or retract into the cavity.

The disclosure further provides a functional device. The functional device may include a frame, a driving assembly a sliding base, and a functional component. The frame may include a bottom plate and a sidewall connected to the bottom plate. The bottom plate and the sidewall cooperatively define a cavity. The sidewall defines an opening communicated with the cavity. The driving assembly is housed in the cavity. The sliding base has a magnetic attraction with the driving assembly. The functional component is supported by the sliding base. The driving assembly is configured to drive the sliding base to move relative to the frame by the magnetic attraction to extend the functional component out of the frame or retract into the cavity via the opening.

BRIEF DESCRIPTION OF THE DRAWINGS

In order to more clearly illustrate the technical solutions of the embodiments of the present disclosure, the drawings used in the embodiments will be briefly introduced below, obviously, the drawings in the following description are some embodiments of the present disclosure, other drawings may also be obtained from those of ordinary skill in the art in view of the drawings.

DETAILED DESCRIPTION OF PREFERRED EMBODIMENTS

Figure 1:
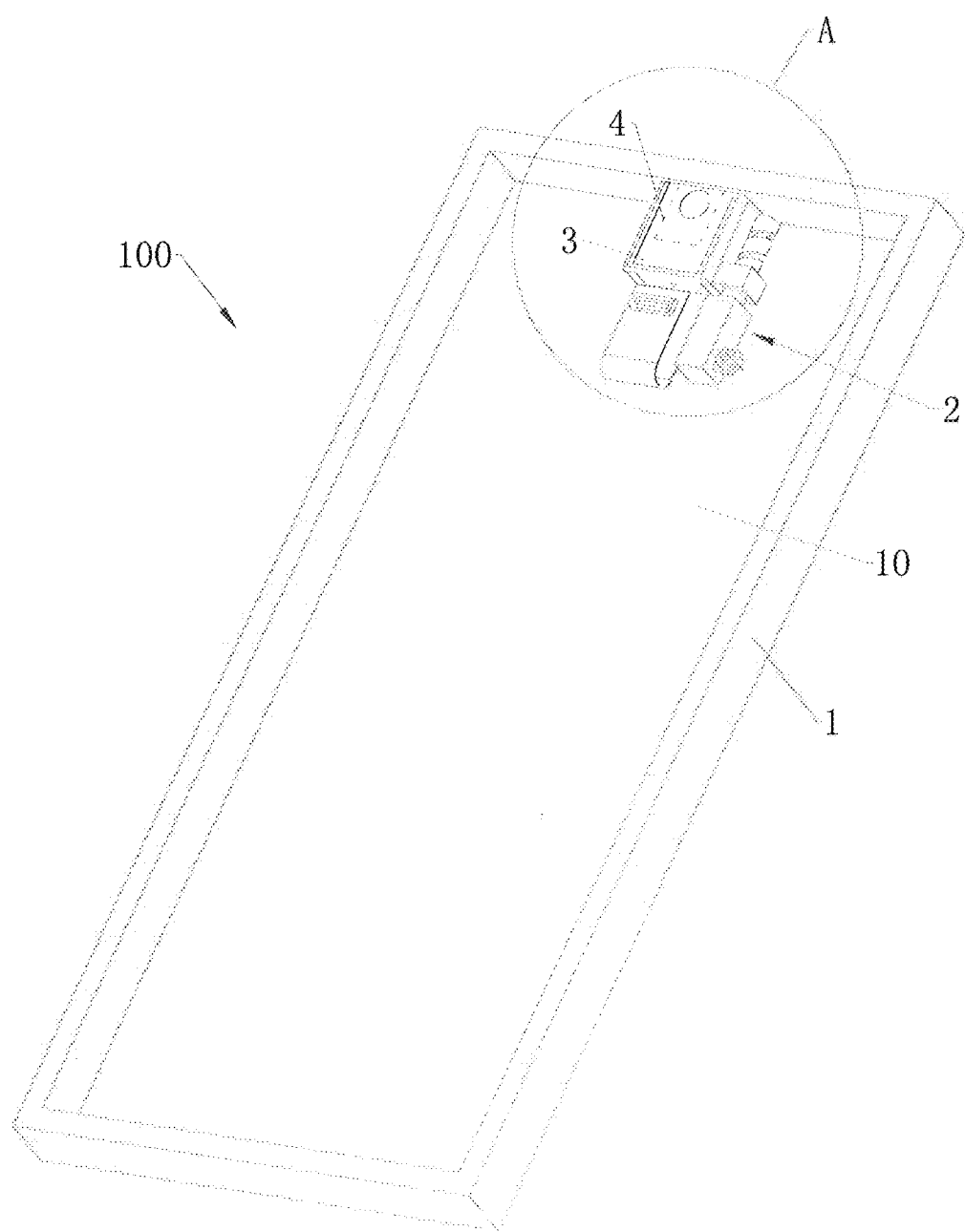
FIG. 1 is a schematic view of a functional device provided by an embodiment of the present disclosure.

In order to make a better understanding of technical solutions of the present disclosure by those skilled in the art, the technical solutions of embodiments of the present disclosure will be described clearly and completely in combination with the accompanying drawings of the embodiments of the present disclosure. Obviously, the described embodiments are merely a part of embodiments of the present disclosure, and not all the embodiments. All other embodiments acquired by those skilled in the art without creative efforts based on the embodiments of the present disclosure shall fall within the protection scope of the present disclosure.

In the description of the present disclosure, the orientation or positional relationship indicated by the terms "center", "up", "down", "front", "rear", "left", "right", "vertical", "horizontal", "top", "bottom", "inside", "outside", "inner", "outer" and the like, is based on the orientation or positional relationship illustrated in the drawings and merely for the purpose of facilitating the description of the present disclosure and simplifying description, rather than indicating or implying that the device or element referred to must have a specific orientation or constructed and operated in a particular orientation, and therefore, should not be construed as limiting the present disclosure.

Terms "first", "second" and so on used in the specification, appended claims, and accompanying drawings of the present disclosure are used to distinguish different objects rather than describe specific sequences. The terms "a number of" or "multiple" means two or more than two.

In the description of the present disclosure, it is to be understood that the terms "install", "connect", "couple" should be broadly understood, unless otherwise specified and defined. For example, a connection may be a fixed connection or a removable connection, or an integrally connection. A connection also can be a directly connection or an indirectly connection by intermediate medium. The specific meaning of the above-mentioned terms in the present disclosure may be understood by those skilled in the art considering specific circumstances.

Additionally, terms "include", "have", and any deformation thereof are intended to cover non-exclusive inclusion relationship. For example, a process, method, system, product, or device including a series of operations or units is not limited to listed operations or units, and In at least one alternative embodiment, can include operations or units which are not listed, or in at least one alternative embodiment, can further include other inherent operations or units for the process, method, product, or device.

The "embodiments" mentioned herein means that features, structures or features described with reference to the embodiments may be included in at least one embodiment of the disclosure. Phrases appearing at various positions of the specification neither always refer to the same embodiment, nor separate or alternative embodiments that are mutually exclusive with other embodiments. It is explicitly and implicitly understood by those skilled in the art that the embodiments described herein may be combined with other embodiments.

The "communication terminal" (or simply "terminal") used in the present disclosure includes, but is not limited to, a device that is configured to connect via a wireline (such as via a public switched telephone network (PSTN), a digital subscriber line (DSL), a digital cable, a direct cable connection, and/or another data connection/network), and/or receive/transmit a communication signal via a wireless interface (e.g., for a cellular network, a wireless local area network (WLAN), a digital television networks such as DVB-H networks, a satellite networks, a AM-FM broadcast transmitters, and/or another communication terminal). Communication terminals that are arranged to communicate over a wireless interface may be referred to as "wireless communication terminals", "wireless terminals", and/or "mobile terminals". Examples of mobile terminals include, but are not limited to, satellite or cellular telephones, personal communication system (PCS) terminals that can combine cellular radiotelephone as well as data processing, faxing, and data communication capabilities, PDAs that may include radiotelephones, pagers, Internet/Intranet access, web browsers, notepads, calendars, and/or global positioning system (GPS) receivers, and conventional laptop and/or palmtop receivers or other electronic devices including radiotelephone transceivers.

Embodiments of the present disclosure provide a functional device and a mobile terminal.

FIG. 1 is a schematic view of a functional device provided by an embodiment of the present disclosure.

As illustrated in FIG. 1, the functional device 100 according to the embodiments of the present disclosure may include a frame 1, a driving assembly 2, a sliding base 3 and a functional component 4. In the illustrated embodiments, the sliding base 3 can be driven by the driving assembly 2 and sliding relative to the frame 1 by magnetic force. The frame 1 defines a cavity 10 therein. The driving assembly 2 is accommodated in the cavity 10.

The frame 1 is mainly configured to support or accommodate the driving assembly 2, the sliding base 3 and the functional component 4.

Figure 2:
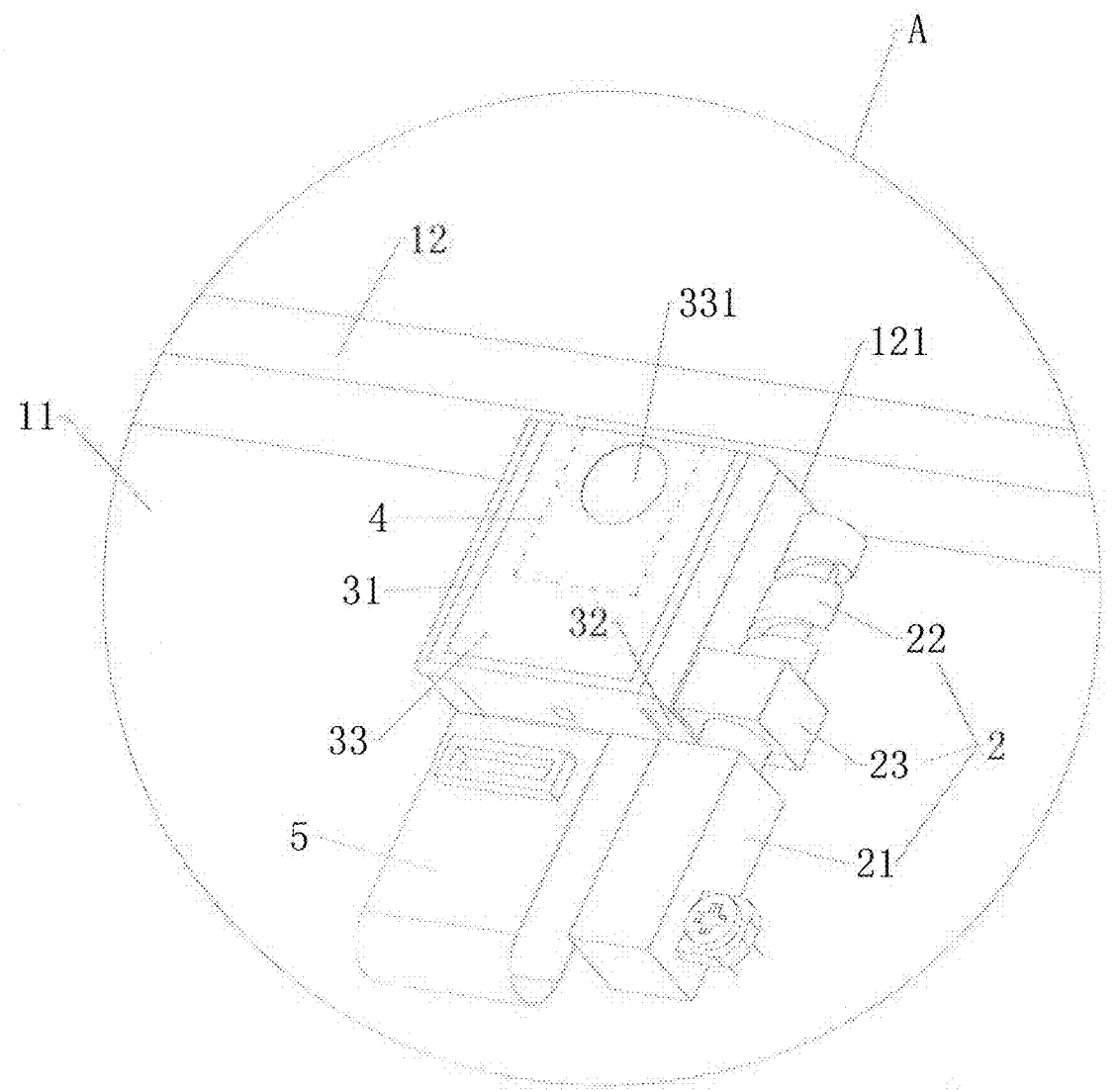
FIG. 2 is a schematic enlarged view of part A in FIG. 1.
Figure 5:
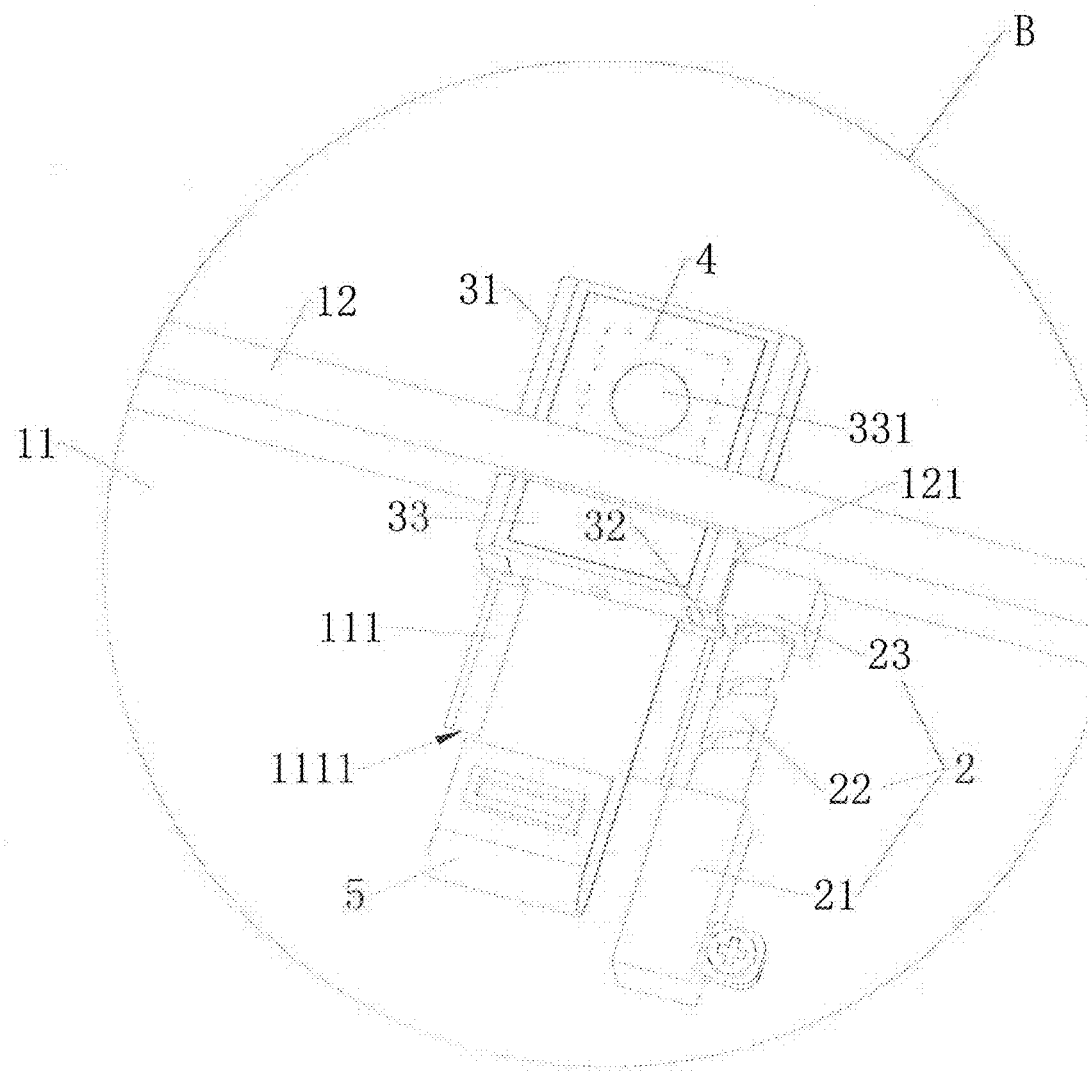
FIG. 5 is a schematic enlarged view of part B in FIG. 4.
Figure 6:
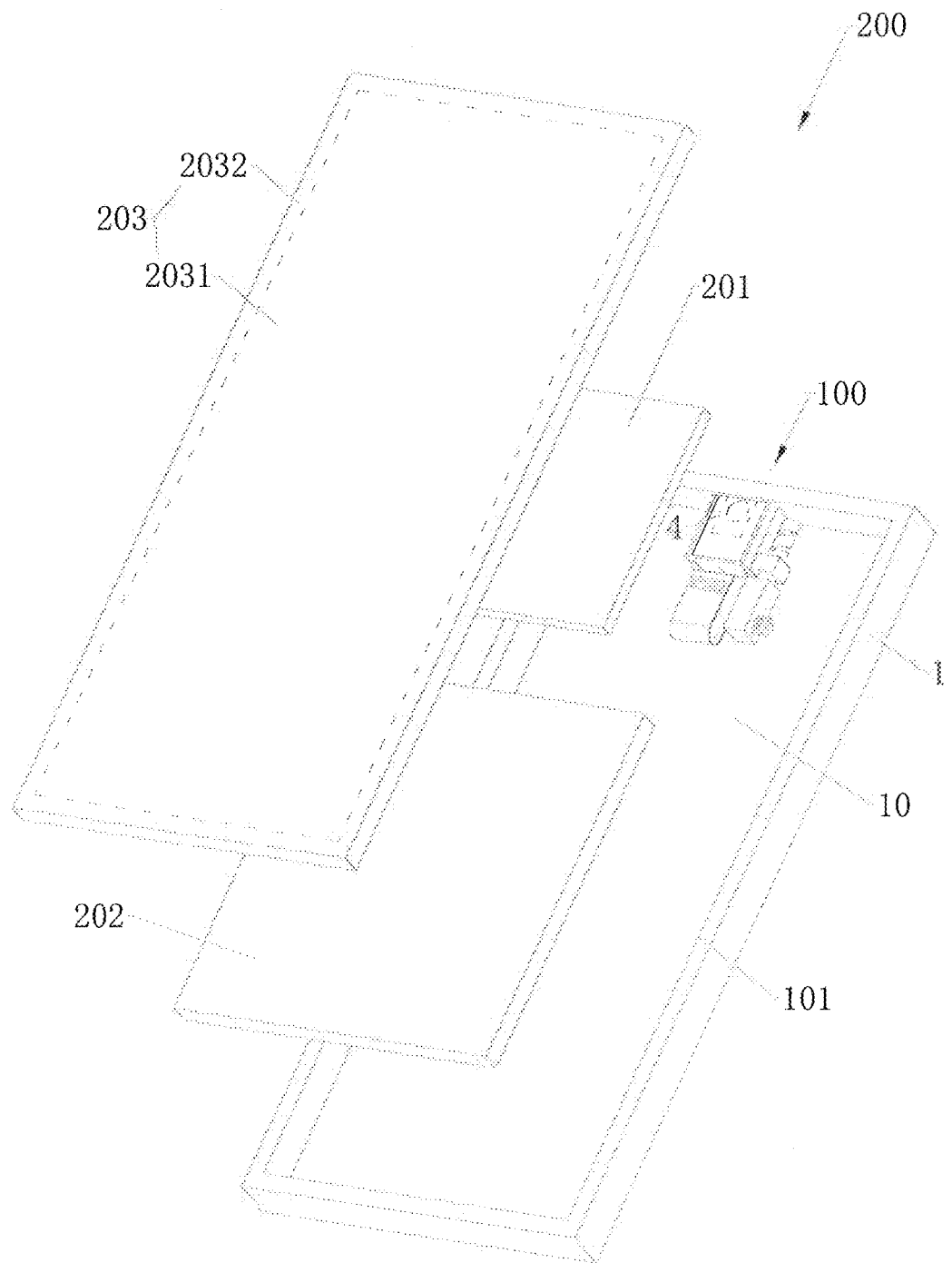
FIG. 6 is an exploded view of a mobile terminal provided by an embodiment of the present disclosure.

Referring to FIG. 2 and FIG. 5 together, in the illustrated embodiment, the frame 1 may include a bottom plate 11 and a sidewall 12 connecting to the periphery of the bottom plate 11. For example, the sidewall 12 may extends from a periphery of the bottom plate 12 in a direction substantially perpendicular to the bottom plate 11. The bottom plate 11 and the sidewall 12 cooperatively define the cavity 10 to accommodate the driving assembly 2, the sliding base 3 and the functional component 4.

As illustrated in FIG. 2 and FIG. 5, the sidewall 12 may define an opening 121 that communicates with the cavity 10. The shape and size of the opening 121 may be in accordance with the sliding base 3, so that the sliding base 3 can be extended or retracted via the opening 121. For example, if the shape of the sliding base 3 is cuboid, the cross section of the opening 121 may be rectangular. The position of the opening 121 may be defined in a portion of the sidewall 12 corresponding to the top of the mobile terminal. The bottom plate 11 may be a back cover of the mobile terminal 200. The sidewall 12 may be the outer frame of the mobile terminal 200.

Figure 4:
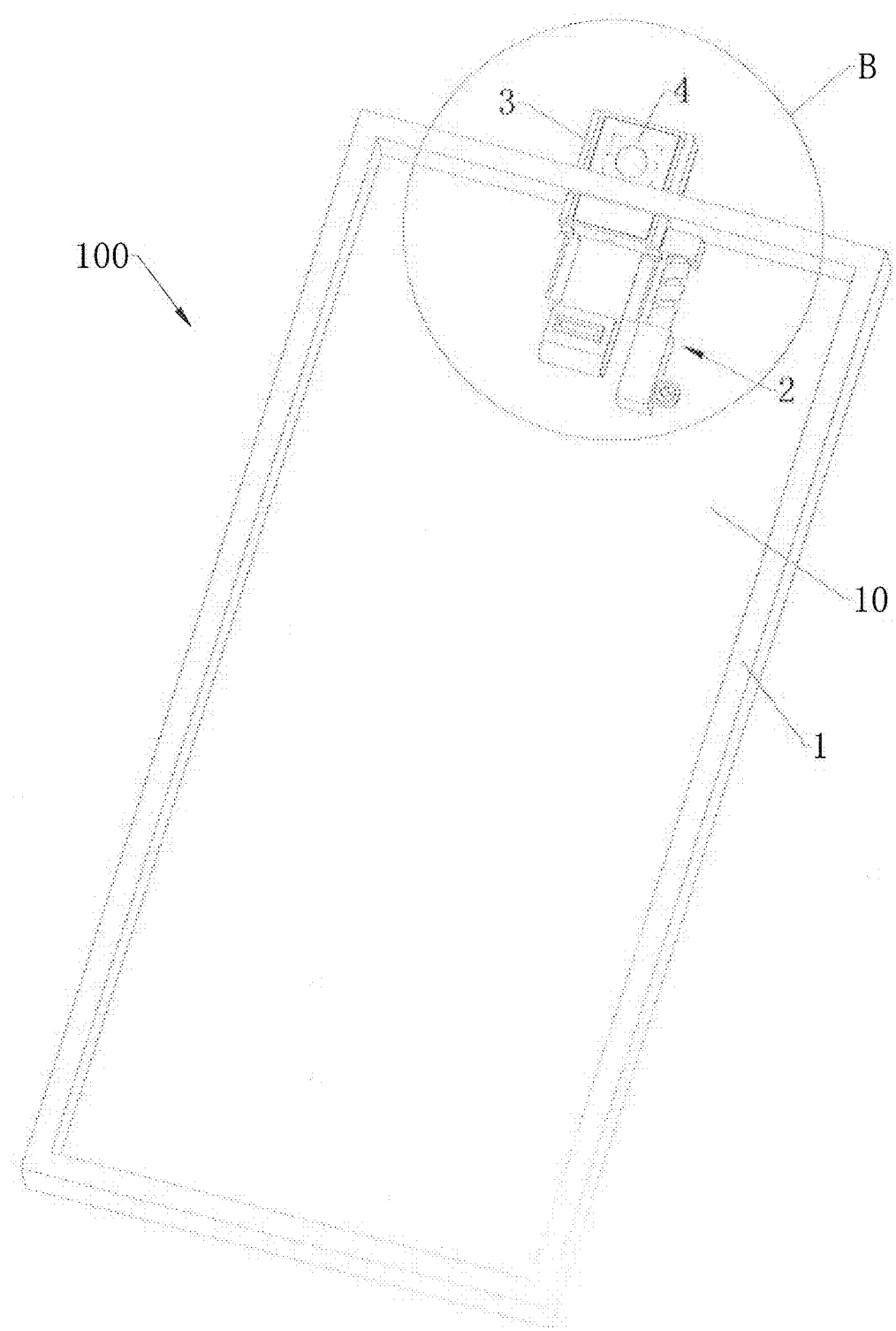
FIG. 4 is a schematic view showing another use state of the functional device illustrated in FIG. 1.

The frame 1 is slidably connected with the sliding base 3 via sliding components. Referring to FIG. 4 and FIG. 5, the frame 1 may further include a guiding slot 111 defined in the bottom plate 11. The guiding slot 111 communicates with the cavity 10 and the opening 121. The sliding base 3 can slide along the guiding slot 111. The guiding slot 111 and the opening 121 cooperatively define the sliding direction of the sliding base 3, thereby ensuring that the functional component 4 supported by the sliding base 3 can smoothly extend or retract via the opening 121.

In addition, the guiding slot 111 may have an end surface 1111 disposed far away from the sidewall 12. The sidewall 12 may have an outer surface 121 far away from the bottom plate 111. The end surface 1111 and the outer surface 121 are cooperatively define a gap therebetween. The sliding base 3 has a length in an extending direction of the guiding slot 111. The ratio of the gap to the length of the sliding base 3 is greater than or equal to 1 and less than or equal to 1.1.

The end surface 1111 of the guiding slot 111 can limit the sliding base 3, for example, can limit the length of the sliding base 3 in the cavity 10 and prevent the sliding base 3 from falling inside the cavity 10 completely, thereby ensuring the reliability of the functional device 100 and the mobile terminal 200. Moreover, when the functional device 100 is accidentally impacted, because the functional component 4 is received in the cavity 10, the sliding base 3 can limit protect the functional component 4.

The sidewall 12 is configured to protect the sliding base 3 and the driving assembly 2 to improve the appearance performance and safety performance of the functional device 100. Since the opening 121 is disposed on the sidewall 12, the functional component 4 is disposed on the side of the frame 1, that is, the functional component 4 is disposed on the side of the mobile terminal 200. Therefore, the functional component 4 may not occupy the front surface of the mobile terminal 200. The display screen of the mobile terminal 20 may have a larger size to increase the screen-to-body ratio (the area ratio of the display area of display screen to the front surface), thereby realizing the full screen design.

In the illustrated embodiment, the bottom plate 11 of the frame 1 carries the sliding base 3 and the driving assembly 2 to ensure that the driving assembly 2 can drive the sliding base 3 to extend or retract with respect to the frame 1.

Referring to FIG. 2, the driving assembly 2 may include a motor 21, a lead screw 22, and a slider 23. The lead screw 22 is connected to a rotating shaft of the motor 21 (not shown). The slider 23 is sleeved on the lead screw 22.

In the illustrated embodiment, the motor 21 can be fixed on the frame 1, for example, fixed on the bottom plate 11. The motor 21 may be selected from a stepping motor and other servo motor capable of achieving precise control, in order to accurately control the movement of the sliding base 3 by the slider 23. Thus, the functional device 100 and the mobile terminal 200 may have a better experience and higher reliability.

The slider 23 may be screwed to the lead screw 22. Specifically, the outer surface of the lead screw 22 is provided with a spiral chute. The slider 23 defines a through hole therein, and a positioning block is arranged on the inner wall of the through hole. The slider 23 is sleeved on the outer surface of the lead screw 22. The positioning block is received in the spiral chute to move along the spiral chute. In the alternative embodiments, the outer surface of the screw rod may be provided with an external thread, and the through hole may have an internal thread on the inner wall thereof. The internal thread is screwed to the external thread.

The extending direction of the lead screw 22 is substantially perpendicular to a side of the sidewall 12 where the opening 121 is provided to reduce the moving stroke of the slider 23.

Referring to FIG. 2, the sliding base 3 is slidably connected to the frame 1. The outer peripheral side wall of the sliding base 3 is clearance fit with the inner peripheral side wall of the opening 121. The gap between the outer peripheral side wall of the sliding base 3 and the inner peripheral side wall of the opening 121 can ensure that the sliding base 3 can smoothly slide relative to the frame 1.

Figure 3:
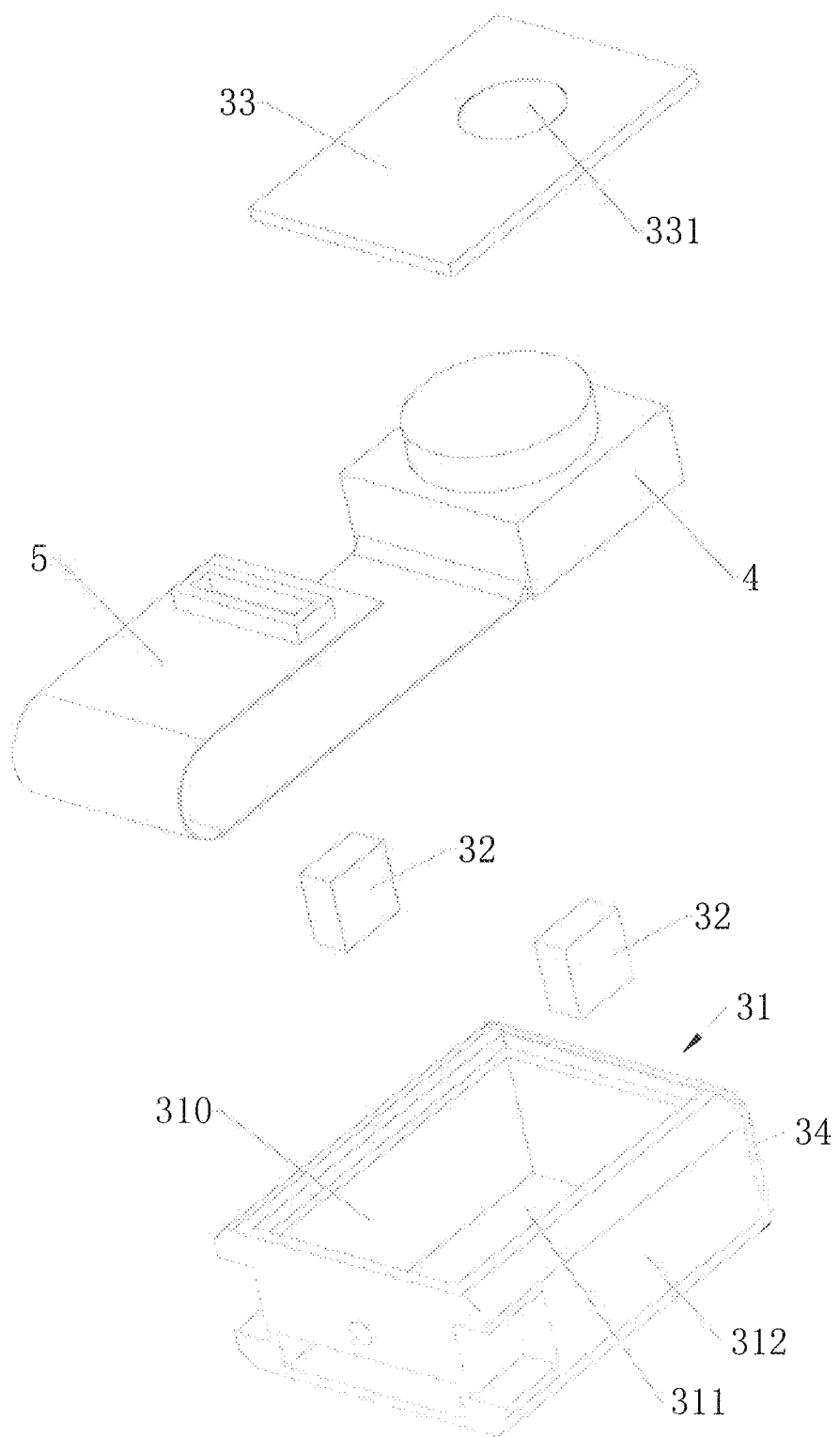
FIG. 3 is an exploded view of a sliding base and a functional component of the functional device illustrated in FIG. 1.

Referring to FIG. 2, FIG. 3 and FIG. 5 together, the sliding base 3 may include a fixing base 31 and a drive block 32. The fixing base 31 is configured to carry the functional component 4. The drive block 32 is fixed on the fixing base 31 and disposed facing the slider 23, and a magnetic attraction force is generated between the slider 23 and the drive block 32. The drive block 32 can be fixed on the fixing base 31 by means of a snap connection, a fastener connection, a bonding or a soldering. In the illustrated embodiment, the drive block 32 can be disposed on one end of the fixing base 31, which is far away from the opening 121, In the illustrated embodiments, the fixing base 31 may include a bottom portion 311 and a side portion 312 disposed around the bottom portion 311. The bottom portion 311 and the side portion 312 are cooperatively define a device space 310. The functional component 4 is received in the device space 310. The sliding base 3 may further include a cover plate 33. The cover plate 33 is connected to the side portion 312 to cover the device space 310. The cover plate 33 is provided with a signal penetrating portion 331 facing the functional component 4. In some embodiments, the signal penetrating portion 331 is a light transmissive lens or a light transmission hole. The signal penetrating portion 331 is for allowing a light signal to pass through. In some alternative embodiments, the signal penetrating portion 331 is a perforated plate or a through hole. The signal penetrating portion 331 is for allowing a sound signal to pass through.

In this embodiment, the cover plate 33 and the fixing base 31 together surround the functional component 4, thereby providing protection. The signal penetrating portion 331 provided on the cover plate 33 can help smoothly interact with the user, when the functional component 4 extends out of the cavity 10. The cover plate 33 protects the functional component 4 and provides a darkroom environment for the functional component 4 to facilitate the shooting of the functional component 4.

In one embodiment, both the slider 23 and the drive block 32 are made of a permanent magnet material, and the drive block 32 and the slider 23 are opposite in magnetism. Magnetic attraction is generated between the drive block 32 and the slider 23, which are magnetically opposite, and attract each other, so that the drive block 32 and the sliding base 3 can be moved by moving the slider 23. Permanent magnet materials, also known as "hard magnetic materials", refer to materials that maintain a constant magnetic property upon magnetization. Permanent magnet materials include, but are not limited to, AlNiCo permanent magnet alloys, iron chromium cobalt permanent magnet alloys, permanent magnet ferrites, rare earth permanent magnet materials, and composite permanent magnet materials.

In another embodiment, the slider 23 is made of a permanent magnet material, and the drive block 32 is made of a ferromagnetic material. Ferromagnetic materials include, but are not limited to, iron, cobalt, nickel, and ruthenium. The fixing base 31 is made of a non-ferromagnetic material. A magnetic attraction force is generated between the slider 23 and the drive block 32, and the slider 23 attracts the drive block 32, so that the drive block 32 and the sliding base 3 can be moved by moving the slider 23. The fixing base 31 is made of a non-ferromagnetic material so as not to be attracted by the slider 23, thereby avoiding interference with the magnetic attraction between the slider 23 and the drive block 32, so that the slider 23 can accurately control the movement of the drive block 32.

Please refer to FIG. 2 and FIG. 5 together, a gap is formed between the slider 23 and the drive block 32. When the functional component 4 is subjected to an impact force directed toward the frame 1, the gap can prevent the slider 23 from striking the drive block 32 and making the sliding base 3 overcome the magnetic force from the slider 23 more quickly. Therefore, the sliding base 3 can carry the functional component 4 retracted into the cavity 10. The functional component 4 can be protected from damage by rigid impact. The reliability of the functional device 100 and the mobile terminal 200 is increased.

The gap between the slider 23 and the drive block 32 is less than or equal to 1 mm. In this condition, the magnetic attraction between the slider 23 and the drive block 32 can ensure that the slider 23 smoothly moves the sliding base 3 by driving the drive block 32. That is, when the slider 23 moves, the drive block 32 will be moved together with the slider 23 due to the magnetic attraction therebetween.

Referring to FIG. 3, the sliding base 3 may further include a sealing ring 34 disposed on the outer periphery of the sliding portion 3 far away from the side portion 312 of the fixing base 31. The sealing ring 34 is sealed between the outer peripheral side wall of the sliding base 3 and the inner peripheral side wall of the opening 121 when the functional component 4 is received into the cavity 10. The sealing ring 34 is configured to prevent external moisture and dust from entering the cavity 10 through the opening 121, thereby improving the reliability of the functional component 4 and the mobile terminal 200. In the illustrated embodiment, the sealing ring 34 is disposed at one end of the fixing base 31, which is exposed from the opening 121.

The sliding base 3 is configured to support or fix the functional component 4 housed therein.

The functional component 4 may be any one or a combination of a camera module, an iris recognition module, a face recognition module, a flash, a microphone, a receiver, a photoreceptor, a fingerprint module, a button, and the like.

In one embodiment, the functional component 4 includes a camera module, and/or an iris recognition module, and/or a face recognition module, and/or a fingerprint recognition module, and/or a flash, and/or a photo sensor. For example, the functional component 4 can be a front camera module. The functional component 4 acquires an image of the captured subject in a direction away from the bottom portion 311.

In another embodiment, the functional component 4 includes a receiver and/or a microphone, and the signal penetrating portion 331 is a perforated plate or a through hole. The signal penetrating portion 331 is for allowing a sound signal to pass through.

In another embodiment, the number of the functional component 4 is multiple, and the number of the signal penetrating portion 331 is multiple correspondingly. A plurality of the signal penetrating portions 331 are correspondingly directed to the plurality of functional components 4 and are adapted to the types of signals received or released by the plurality of functional components 4.

Furthermore, please refer to FIG. 2, FIG. 3 and FIG. 5 together, the functional device 100 may further include a flexible printed circuit (FPC) 5. One end of the FPC 5 extends into the sliding base 3 and is electrically coupled to the functional component 4, and the other end of the FPC 5 protrudes from the sliding base 3. The other end of the FPC 5 is located within the cavity 10 to electrically coupled to other components located within the cavity 10, such as the main board 201 of the mobile terminal 200.

Please refer to FIG. 1 to FIG. 5 together, when the rotating shaft drives the lead screw 22 to rotate, the slider 23 drives the sliding base 3 to move relative to the frame 1 to extend the functional component 4 out of the cavity 10 or retract into the cavity 10.

In this embodiment, since there is the magnetic force between the slider 23 and the sliding base 3, the sliding base 3 can follow the slider 23's movement. When the rotating shaft of the motor 21 rotates, the lead screw 22 is rotated, so that the slider 23 sleeved on the lead screw 22 is moved. The movement of the slider 23 drives the sliding base 3 to move relative to the frame 1, so that the functional component 4 is extended out of the cavity 10 or retract into the cavity 10. When the functional component 4 of the functional device 100 protrudes from the cavity 10, the functional component 4 is guaranteed to interact with the user. When the functional component 4 is received into the cavity 10, the volume of the mobile terminal 200 is reduced, so that users can carry the mobile terminal 200 conveniently. Therefore, the functional device 100 improves the user experience. Since the slider 23 and the sliding base 3 are connected to each other by magnetic attraction, there is no rigid connection between the slider 23 and the sliding base 3. Therefore, if the functional component 4 is subjected to an impact force directed toward the frame 1, the sliding base 3 can quickly overcome the magnetic force from the slider 23, so that the sliding base 3 carries the functional component 4 into the cavity 10, and the functional component 4 can be prevented from being damaged by the rigid impact. The functional device 100 and the mobile terminal 200 have higher reliability.

Furthermore, a detecting device for detecting the position of the sliding base 3 can be disposed in the mobile terminal 200 to detect whether the sliding seat 3 is received in the cavity 10. The detecting device may be an infrared sensor. Furthermore, the detecting device can also be a circuit. The circuit is connected in series with a switch that can cooperate with the sliding seat 3. When the sliding base 3 protrudes from the cavity 10, the switch is in the first state, thereby causing the circuit to form an open circuit. When the sliding base 3 is received in the cavity 10, the side of the sliding base 3 facing the switch contacts the switch to switch the switch from the first state to the second state, thereby switching the circuit to the conductive state. The mobile terminal 200 can determine that the sliding base 3 is in a state of protruding from the cavity 10 or receiving in the cavity 10 by detecting whether the circuit is in the conductive state. The state in which the sliding base 3 protrudes from the cavity 10 can be referred to FIG. 4 and FIG. 5. The state in which the sliding base 3 is received in the cavity 10 can be referred to FIG. 1 and FIG. 2.

When the detecting device detects that the sliding base 3 is disengaged from the slider 23 against the magnetic attraction force and carries the functional component 4 into the cavity 10, the mobile terminal 200 can control the rotation of the motor 21 to drive the screw 22 to rotate, thereby moving the slider 23 toward the motor 21, so that the slider 23 can return to the state shown in FIG. 1 or FIG. 2.

Figure 7:
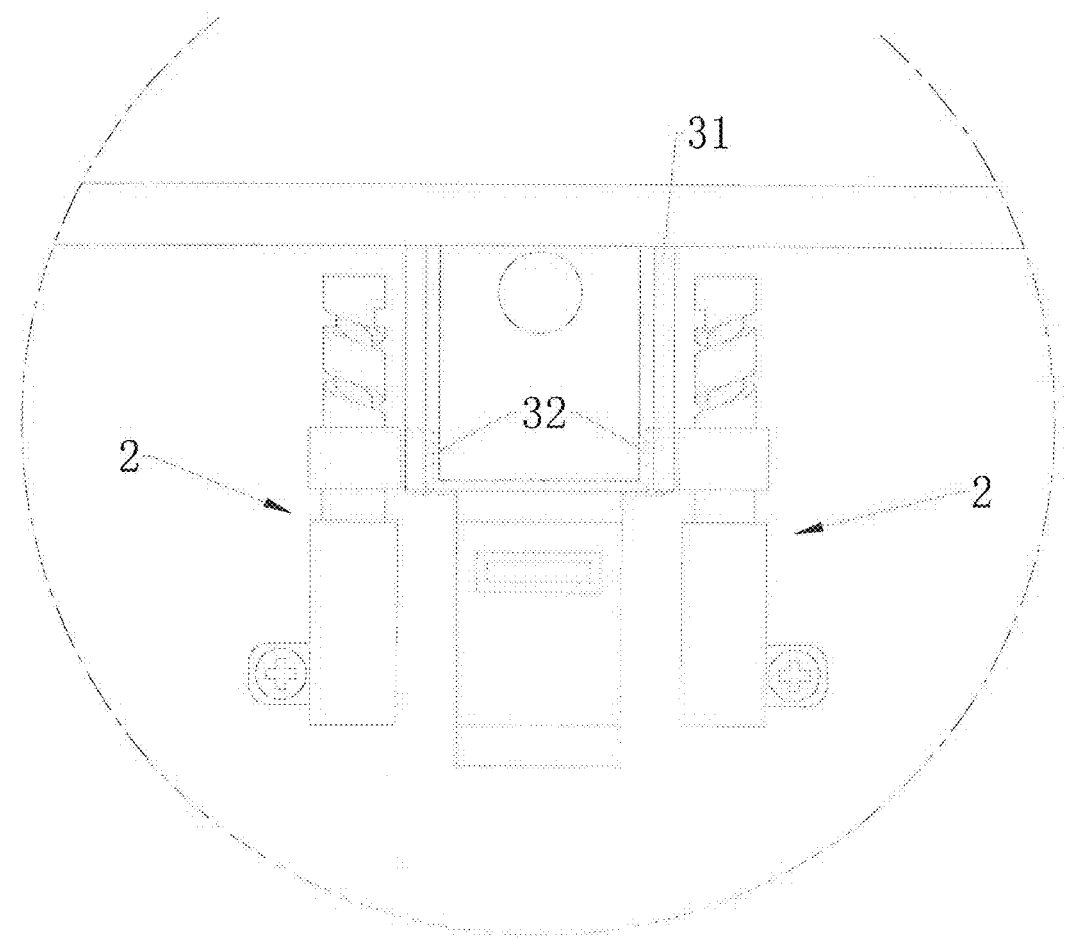
FIG. 7 is a schematic view of another embodiment of a functional device provided by an embodiment of the present disclosure.

Please refer to FIG. 3 and FIG. 7 together, in some embodiment, the number of the driving assembly 2 can be two, and the two driving assemblies 2 are respectively located on both sides of the fixing base 31. Correspondingly, the number of the drive block 32 is two, two drive blocks 32 are respectively embedded on the two opposite side portions 312 of the fixing base 31, and the two drive blocks 32 are disposed correspondingly to the two groups of the slider 23 of the driving assembly 2.

In this embodiment, the two driving assemblies 2 can simultaneously move the two driving blocks 32 by driving the two sliders 23, thereby moving the sliding base 3 more quickly and accurately. The functional device 100 can protrudes from the cavity 10 and retract into the cavity 10 action more faster, more accurate and more reliable.

Wherein, the two groups of the driving assembly 2 and the sliding base 3 are arranged in the plane direction of the mobile terminal 200 (that is, the vertical direction of the thickness direction of the mobile terminal 200) to avoid increasing the thickness of the mobile terminal 200, which is facilitating the thinness of the mobile terminal 200.

It can be understood that, the functional device 100 described above can be applied to a mobile terminal 200. The mobile terminal 200 can be a mobile phone, a tablet computer, a laptop computer, or the like.

As illustrated in FIG. 7, the embodiment of the present disclosure further provides a mobile terminal 200.

The mobile terminal 200 may include the functional device 100 as described in any of the above embodiments. The mobile terminal 200 according to the embodiment of the present disclosure may be any device having communication and storage functions, such as a tablet computer, a mobile phone, an e-reader, a remote controller, a personal computer (PC), a notebook computer, an in-vehicle device, and a network television. A smart device with network capabilities such as wearable devices.

The mobile terminal 200 may include the frame 1, the functional component 4, the driving assembly 2 and the sliding base 3. The frame 1. i.e. the housing of the mobile terminal 200 defines the cavity 10 with a receiving opening 101. The mobile terminal 200 further includes a battery 202, a main board 201, and the like housed in the cavity 10.

Furthermore, the receiving opening 101 is perpendicular to the sliding direction of the functional component 4. The mobile terminal 200 may further include a display module 203, and the display module 203 is covered with the frame 1 and covers the receiving opening 101. Since the functional component 4 can flexibly extend out of the cavity 10 or retract into the cavity 10 according to the use requirement, the functional component 4 does not need to occupy the front space of the mobile terminal 200 and does not limit the screen ratio of the display module 203. The display screen of the mobile terminal 20 may have a larger size to increase the screen-to-body ratio (the area ratio of the display area of display screen to the front surface), thereby realizing the full screen design.

Wherein, the display module 203 may include a display area 2031 and a frame area 2032 disposed around the display area 2031. The ratio of the area of the display area 2031 to the area of the frame area 2032 is greater than or equal to 9. In other words, the ratio of the display area 2031 occupying the front surface area of the display module 203 is greater than or equal to 90%. In this condition, the display module 203 can implement full screen display. The frame area 2032 is used to arrange a driving cable to cause the display area 2031 to perform screen display.

The display module 203 can be a touch display module 203. The display module 203 can be a liquid crystal display (LCD) or an organic light-emitting diode (OLED).

The above is an implementation manner of the embodiment of the present disclosure, it should be noted that, it will be apparent to those skilled in the art that various modifications and improvements can be made without departing from the principles of the embodiments of the present invention.

What is claimed is:

1. A functional device for a mobile terminal, comprising:
   a frame, defining a cavity;
   a driving assembly, housed in the cavity, the driving assembly comprising a motor, a lead screw, and a slider, the lead screw being connected to a rotating shaft of the motor, and the slider being sleeved on the lead screw; and
   a sliding base slidably connected to the frame and having a magnetic attraction with the slider, configured to hold a functional component, when the rotating shaft driving the lead screw to rotate, the slider driving the sliding base to move relative to the frame to extend the functional component out of the frame or retract into the cavity.

2. The functional device as claimed in claim 1, wherein the sliding base comprises a fixing base and a drive block, the fixing base is configured to carry the functional component, the drive block is fixed on the fixing base and disposed facing the slider, and a magnetic attraction force is generated between the slider and the drive block.

3. The functional device as claimed in claim 2, wherein both the slider and the drive block are made of a permanent magnet material, and the drive block and the slider are opposite in magnetism.

4. The functional device as claimed in claim 2, wherein the slider is made of a permanent magnet material, the drive block is made of a ferromagnetic material, and the fixing base is made of a non-ferromagnetic material.

5. The functional device as claimed in claim 2, wherein a gap is formed between the slider and the drive block.

6. The functional device as claimed in claim 2, wherein the driving assembly comprises two driving assemblies, the two driving assemblies are respectively located on both sides of the fixing base, the drive block comprises two drive blocks, the two drive blocks are respectively embedded on the two opposite side portions of the fixing base, and the two drive blocks are disposed correspondingly to the two sliders of the driving assembly.

7. The functional device as claimed in claim 2, wherein the fixing base comprises a bottom portion and a side portion disposed around the bottom portion, the bottom portion and the side portion are cooperatively define a device space, the functional component is received in the device space, the sliding base further comprises a cover plate, and the cover plate is connected to the side portion to cover the device space, and the device space is provided with a signal penetrating portion facing the functional component.

8. The functional device as claimed in claim 7, wherein the functional component comprises a camera module, an iris recognition module, a face recognition module, a fingerprint recognition module, a flash, or a photo sensor, and the signal penetrating portion is a light transmissive lens or a light transmission hole.

9. The functional device as claimed in claim 7, wherein the functional component comprises a receiver and/or a microphone, and the signal penetrating portion is a perforated plate or a through hole.

10. The functional device as claimed in claim 1, wherein the frame comprises a bottom plate and a sidewall connecting the periphery of the bottom plate, the sidewall is provided with an opening that communicates with the cavity, the sliding base is slidably connected to the sidewall via the opening, when the rotating shaft driving the lead screw to rotate, the slider driving the sliding base to extend the functional component out of the frame or retract into the cavity via the opening.

11. The functional device as claimed in claim 10, wherein the outer peripheral side wall of the sliding base is clearance fit with the inner peripheral side wall of the opening.

12. The functional device as claimed in claim 11, wherein a sealing ring is disposed on the outer periphery of the sliding portion away from the side portion of the fixing base, the sealing ring is sealed between the outer peripheral side wall of the sliding base and the inner peripheral side wall of the opening when the functional component is received in the cavity.

13. The functional device as claimed in claim 10, wherein the bottom plate is provided with a guiding slot, the guiding slot communicates with the cavity and the opening, and the sliding base slides along the guiding slot.

14. The functional device as claimed in claim 13, wherein the guiding slot comprises an end surface far away from the sidewall, a gap is formed between the end surface of the guiding slot and the outer surface of the sidewall, the sliding base has a length in an extending direction of the guiding slot, and the ratio of the gap to the length is greater than or equal to 1 and less than or equal to 1.1.

15. The functional device as claimed in claim 1, wherein the functional device further comprises a flexible printed circuit, one end of the flexible printed circuit extends to the sliding base and is electrically connected to the functional component, and the other end of the flexible printed circuit protrudes from the sliding base.

16. A mobile terminal comprising:
   a housing, defining a cavity with a receiving opening;
   a display module, engaged with the housing and covering the receiving opening; and
   a functional device housed in the cavity, the functional device comprising:

a functional component;

a driving assembly, housed in the cavity, the driving assembly comprising a motor, a lead screw, and a slider, the lead screw being connected to a rotating shaft of the motor, and the slider being sleeved on the lead screw; and a sliding base slidably connected to the frame and having a magnetic attraction with the slider, configured to hold the functional component, when the rotating shaft driving the lead screw to rotate, the slider driving the sliding base to move relative to the housing to extend the functional component out of the housing or retract into the cavity.

17. The mobile terminal as claimed in claim 16, wherein the frame comprises a bottom plate and a sidewall connecting the periphery of the bottom plate, the sidewall is provided with an opening that communicates with the cavity, the sliding base is slidably connected to the sidewall via the opening, when the rotating shaft driving the lead screw to rotate, the slider driving the sliding base to extend the functional component out of the frame or retract into the cavity via the opening.

18. The mobile terminal as claimed in claim 17, wherein the display module comprises a display area and a frame area disposed around the display area, the ratio of the area of the display area to the area of the frame area is greater than or equal to 9.

19. A functional device, comprising:

a frame, comprising a bottom plate and a sidewall connected to the bottom plate, the bottom plate and the sidewall cooperatively defining a cavity, and the sidewall defining an opening communicated with the cavity;

a driving assembly, housed in the cavity;

a sliding base, having a magnetic attraction with the driving assembly; and a functional component, supported by the sliding base;

the driving assembly being configured to drive the sliding base to move relative to the frame by the magnetic attraction, to extend the functional component out of the frame or retract into the cavity via the opening.

20. The functional device as claimed in claim 19, wherein the driving assembly comprises a motor, a lead screw, and a slider, the lead screw being connected to a rotating shaft of the motor, the slider being sleeved on the lead screw, the sliding base having a magnetic attraction with the slider, when the rotating shaft driving the lead screw to rotate, the slider driving the sliding base to move relative to the frame.

* * * * *